United States Patent [19]

Bloom

[11] 4,371,874

[45] Feb. 1, 1983

[54] CHAFF DIPOLE ELEMENTS AND METHOD OF PACKAGING

[75] Inventor: Richard L. Bloom, Greenbelt, Md.

[73] Assignee: The United States of America as represented by the Secretary of the Navy, Washington, D.C.

[21] Appl. No.: 401,933

[22] Filed: Oct. 5, 1973

[51] Int. Cl.[3] .......... G01S 7/38

[52] U.S. Cl. .......... 343/18 B; 343/18 E

[58] Field of Search .......... 343/18 E, 18 B

[56] References Cited

U.S. PATENT DOCUMENTS

| | | | |
|---|---|---|---|
| 3,500,409 | 3/1970 | Cash | 343/18 E |
| 3,519,221 | 7/1970 | Kifor | 343/18 E |
| 3,544,997 | 12/1970 | Turner et al. | 343/18 E |

*Primary Examiner*—T. H. Tubbesing

*Attorney, Agent, or Firm*—Robert F. Beers; William T. Ellis; Melvin L. Crane

[57] ABSTRACT

Chaff dipole elements formed from a plurality of different materials of the same size and length but of different weight suitable for placing into a dispensing package and dispersed as desired.

7 Claims, No Drawings

CHAFF DIPOLE ELEMENTS AND METHOD OF PACKAGING

BACKGROUND OF THE INVENTION

This invention relates to chaff dispersing and more particularly to chaff dipoles which have a different fall rate after being dispersed.

Chaff is known to be an electro-magnetic reflector material used for military purposes as a countermeasure against enemy radars. Chaff may be made of solid metallic elements of a specific length and diameter. Also, it may be made of small non-metallic elements coated with a thin coating of a particular metal, thus bringing about a savings of metal. Millions of these elements may be packaged into a dispenser and dispersed as necessary to present false target information to confuse the enemy.

Heretofore, chaff packages and dispersing systems made use of one type of dipole material within the same package. Therefore, the elements have the same fall rate. Further, dipole elements of the same materials are known to clump or cling together, therefore, they are not dispersed as expected. It has been determined that the efficiency of dispersion cross section response is about 25% of theoretical value and that efficiency depends upon the type of dispersion used.

SUMMARY OF THE INVENTION

This invention relates to the formation of chaff elements of different materials (metals) each having the same size in length and approximately the same diameter but each different material having a different weight. Each dipole element having a different weight will have a different fall rate thereby presenting a much larger radar signature than that of elements of the same or different material having the same weight. These dipoles do not clump or cling together upon falling, they present a larger radar cross section for the same amount of material or number of elements. Furthermore, the mixed dipoles are independent of the dispenser used and is compatible with known dispersers. One such disperser has been set forth in U.S. Pat. No. 3,500,409.

DETAILED DESCRIPTION

In accordance with the teaching of this invention, chaff dipole elements are formed of different materials into solid dipole elements or a non-metallic material is coated by any well known method with a smooth layer of the desired metal. The separate dipole elements are made of aluminum, copper, zinc, tin or any other desired metal that will reflect incident electromagnetic radiation back to its source. The dipole elements are made of the same length, from about ¼ inch to about 2 inch, and of the same diameter of from about 1 mil to about 10 mils, so that each dipole element made of a different metal or metal coating will have a different weight. Likewise, each dipole element of the same metal or metal coating will have the same weight. Furthermore, each like dipole element will have the same resistance and each dipole of different material will have a different resistance from the others.

The following list sets forth different weights and resistances for different metals:

| Material | Weight (#/IN$^3$) | Resistance (Ω/in) (3 mil wire) |
|---|---|---|
| Aluminum | 0.0975 | 0.1433 |
| Copper | 0.3236 | 0.0875 |
| Zinc | 0.2576 | 0.2917 |
| Tin | 0.2076 | 0.5833 |

Chaff dipole elements made of the different type metals set forth above are arranged within a dispersing package such that the different type metallic dipole elements will be mixed together in the same compartment of a disperser. That is, the dipole elements of aluminum, copper, zinc and tin will all be mixed in either a side-by-side relationship or randomly mixed. An important factor is that the dipole elements of one material not be grouped in side-by-side relationship.

It has been determined that side-by-side dipole elements of the same metal tend to cling to each other and are not dispersed upon release from their dispenser. Therefore, it is important that the different type metal particles be mixed. When mixed they do not cling to each other and they are dispersed more readily upon being dispensed.

In operation, the dipole elements are made from different metals or of a non-metallic element each coated with the different metals. The elements are made to have approximately the same diameter and length and as such each dipole made of a different metal will have a different weight. Due to the different weight of the dipoles in the chaff package, the fall rate of the dispersed dipole cloud is diversified, thereby obtaining a wide range of dispersion in range, elevation and azimuth.

Thus, chaff formed by a plurality of dipole elements formed of a plurality of metals and mixed together in a chaff dispenser will produce an effective, efficient chaff decoy with a large radar cross section when dispersed.

The dipole elements may be made of different lengths and stacked within a chaff disperser in different layers with the same length dipoles all in the same layer or with a plurality of layers each having the same length dipole elements. Each layer must have a mixture of different material dipoles but of the same length and diameter.

Obviously many modifications and variations of the present invention are possible in light of the above teachings. It is therefore to be understood that within the scope of the appended claims the invention may be practiced otherwise than as specifically described.

I claim:

1. A method of packaging chaff dipole elements which comprises:
   - making dipole elements of different material each having the same length and approximately the same diameter but of different weight,
   - mixing the different material dipole elements together, and
   - assembling a plurality of said mixed dipole elements into a side-by-side arrangement.

2. A method as claimed in claim 1; wherein,
   - said mixed dipole elements are assembled into a plurality of stacked rows.

3. A mixture of a plurality of different type electromagnetic radiation relfective metal, chaff dipole elements for packaging into a dispenser for chaff dispersion;

each different type element formed by a different type of metal with the same length and cross sectional area, but of different weight, whereby each different type metal dipole element has a different fall rate when simultaneously dispensed.

4. A mixture of chaff dipole elements as claimed in claim 3; wherein, said different metal dipole elements in said mixture are aluminum and copper.

5. A mixture of chaff dipole elements as claimed in claim 3; wherein said different metal dipole elements are aluminum and zinc.

6. A mixture of chaff dipole elements as claimed in claim 3; wherein, said different metal dipole elements in said mixture are aluminum and tin.

7. A mixture of chaff dipole elements as claimed in claim 3; wherein, said different metal dipole elements in said mixture are aluminum, copper, zinc and tin.

* * * * *